United States Patent [19]

Nakayama et al.

[11] Patent Number: 4,745,985
[45] Date of Patent: May 24, 1988

[54] AUTOMOTIVE VEHICLE POWER-STEERING SYSTEM AND METHOD

[75] Inventors: Masafumi Nakayama; Tokiyoshi Yanai; Hirotsugu Yamaguchi; Yutaka Aoyama; Moritsune Nakata, all of Kanagawa, Japan

[73] Assignee: Nissan Motor Company Limited, Yokohama, Japan

[21] Appl. No.: 710,669

[22] Filed: Mar. 12, 1985

[30] Foreign Application Priority Data

Mar. 14, 1984 [JP] Japan ............... 59-48524

[51] Int. Cl.⁴ ............... B62D 5/06; B62D 5/087
[52] U.S. Cl. ............... 180/142
[58] Field of Search ............... 180/142, 141, 132, 79.3, 180/143, 79.1; 74/388 PS

[56] References Cited

U.S. PATENT DOCUMENTS

| | | | |
|---|---|---|---|
| 4,473,128 | 9/1984 | Nakayama | 180/142 |
| 4,476,529 | 10/1984 | Nakamura | 180/142 |
| 4,509,611 | 4/1985 | Kade | 180/142 |

FOREIGN PATENT DOCUMENTS 76760 6/1980 Japan ............... 180/141

Primary Examiner—John J. Love
Assistant Examiner—Everett G. Diederiks, Jr.
Attorney, Agent, or Firm—Schwartz, Jeffery, Schwaab, Mack, Blumenthal & Evans

[57] ABSTRACT

This automotive vehicle power-steering system can positively compensate for resistance to the return of a steering linkage from an operating position to its neutral rest position after the vehicle turns a corner, and can enhance a steerability of the vehicle. The system includes a controller ordering a power-assist actuator to reduced the steering angular deviation of a steering wheel to zero when the controller receives a zero-level signal from a steering torque sensor and non-zero-level signal from a steering angular deviation sensor. The method for the system includes a step of controlling the power-assist actuator to generate a return-assist force counteracting the resistance and variable according to vehicle conditions.

11 Claims, 4 Drawing Sheets

AUTOMOTIVE VEHICLE POWER-STEERING SYSTEM AND METHOD

BACKGROUND OF THE INVENTION

1. Field of the Invention

This invention relates to an automotive vehicle power-steering system and method, and more particularly to an automotive vehicle power-steering system comprising a hydraulic or electromotive power-assist actuator for controlling a manual steering force.

2. Description of the Related Art

Both hydraulic and electromotive automotive vehicle power-steering systems are well known. Japanese published unexamined utility model application No. 56-136855 discloses an example of a hydraulic power-steering system for an automotive vehicle. This system comprises an oil pump driven by an engine, a reservoir, a control valve, a power-assist actuator actuating steerable road wheels, an electrical control unit for the control valve, and connecting hydraulic lines. The control valve includes a spool and two solenoids electrically connected to the control unit. The control unit receives electrical signals T, $\omega$, $\dot{\omega}$ and V and provides the solenoids with controlled electrical currents in response thereto. The signal T represents a manual steering force applied to a steering wheel. The signal $\omega$ represents the angular deviation of the steering wheel from its neutral position. The signal $\dot{\omega}$ represents the angular velocity of the steering wheel. The signal V represents vehicle speed.

In this known system, when steering torque drops to zero, so that the steering wheel tends to return to its neutral position, e.g. after the automotive vehicle exits a corner, the control valve tends to occupy the neutral position at which no oil pressure is applied to the power cylinder. After turning a corner, the steerable road wheels tend to return to a straight-ahead position due to wheel alignment and at the same time, the steering wheel also tends to return to its neutral position. However, since the frictional forces developed in moving parts of the power-assist actuator and of the steering linkage act against the return of the steering wheel to its neutral position, the driver must manually return the steering wheel to its neutral position.

When the steering force applied to the steering wheel is released, the steering system shifts toward its neutral position due to the centering force treated by wheel alignment. However, neutralization of the steering system ends to delay due to resistance caused by friction in the movement of the actuator and/or the steering linkage. This requires a manual neutralizing operation to degrade the drivability of the vehicle.

SUMMARY OF THE INVENTION

Therefore, it is an object of the invention to provide an automotive power-steering system which is adapted to produce an assist-force for smooth neutralization of the steering system.

Another object of the invention is to provide an automotive power-steering system which is capable of deriving a reverse assist-force for neutralizing the steering system depending upon a predetermined control parameter or parameters.

In order to accomplish the above-mentioned and other objects, an automotive power-steering system, according to the invention, includes means for detecting demand for neutralization of the steering system and for ordering the controlling operation of a power-assist actuator in a reverse direction relative to the steering direction so that the steering system can be neutralized by aid of the power-assist actuator.

Preferably, the detecting and ordering means orders the power-assist actuator to derive the assist force on the basis of preselected control parameters, such as a vehicle speed, a shifting magnitude of the steering system from its neutral position and so forth.

DESCRIPTION OF THE PREFERRED EMBODIMENTS

Figure 1:
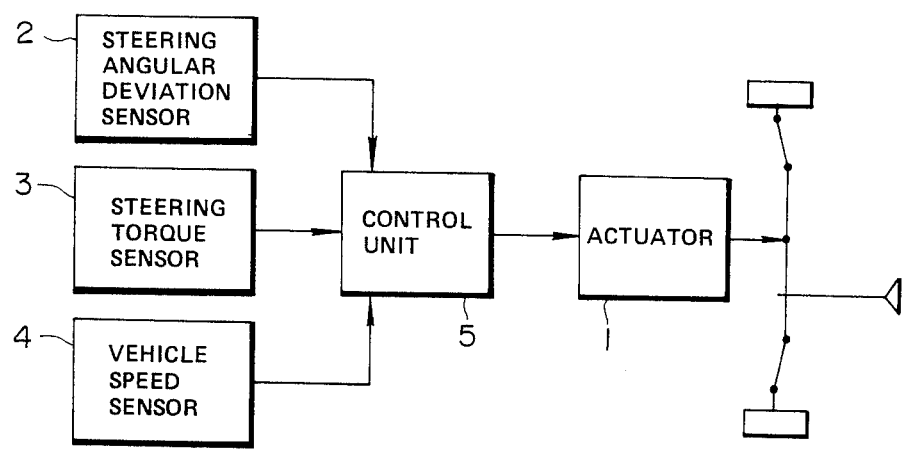
FIG. 1 is a block diagram of an automotive vehicle power-steering system of this invention.

The preferred embodiments will be described in detail with reference to FIGS. 1 to 5.

In summary, an automotive vehicle power-steering system of this invention comprises a hydraulic or electromotive power-assist actuator 1, a sensor 2 monitoring steering angular deviation, a sensor 3 monitoring steering torque such as a piezoresistance effect torque sensor, a sensor 4 monitoring vehicle speed, and a control unit 5 such as a microcomputer. This control unit 5, in response to the steering angular deviation signal $\omega$ and the vehicle speed signal V, controls the power-assist actuator 1 to return the steering wheel to the normal position when it detects a zero-level steering torque T and a non-zero-level steering angular deviation $\omega$.

Figure 2:
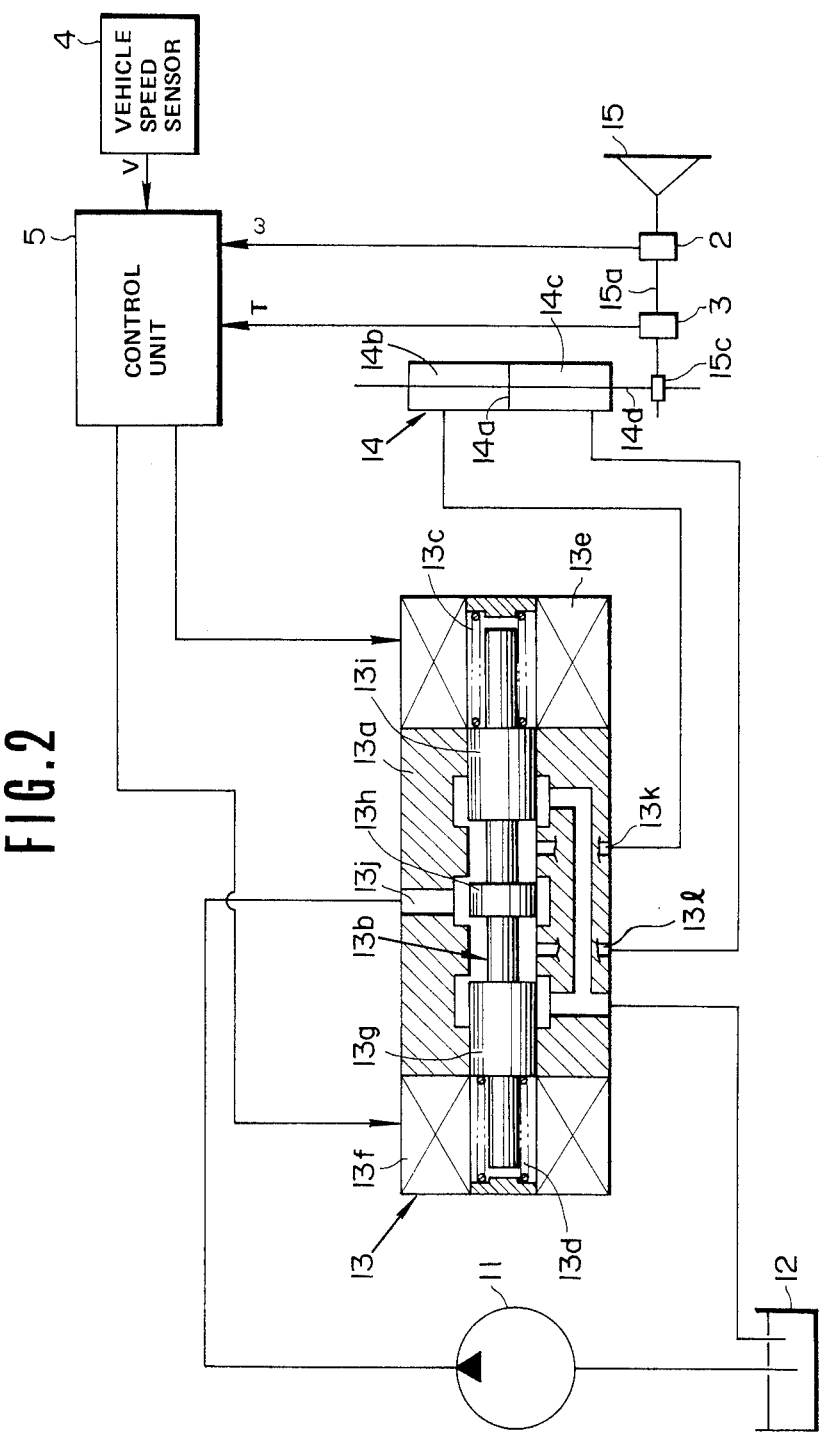
FIG. 2 is a diagram, including a section through a control valve, of the automotive vehicle power-steering system of FIG. 1.

FIG. 2 illustrates the first embodiment of the system of FIG. 1 in greater detail. An oil pump 11 driven by the engine sends working hydraulic fluid from an oil reservoir 12 to a control valve 13. The control valve 13 applies a controlled pressure to a right-hand- or left-hand-chamber 14b or 14c of a power cylinder 14. A combination of the oil pump 1, the control valve 13 and the power cylinder 14 constitutes said power-assist actuator 1.

The control valve 13 comprises a valve housing 13a, a spool 13b, two preset reaction springs 13c and 13d urging the spool 13b towards its normal rest position as shown in FIG. 2, two solenoids 13e and 13f electrically connected to the control unit 5. The spool 13b comprises annular lands 13g, 13h and 13i. The valve housing 13a has an input port 13j, a first output port 13k and a second output port 13l. In the normal position of the control valve 13, the spool 13b is centered between the first and second output ports 13k and 13l, and the oil flow through the input port 13j is returned to the oil reservoir 12.

The power cylinder 14, which is a double-acting cylinder, includes a piston 14a rigidly connected to a steering rack 14d. The right-hand chamber 14b is hydraulically connected to the first output port 13k and the left-hand chamber 14c is hydraulically connected to the second output port 13l.

A pinion 15c of the steering shaft 15a meshes with the steering rack 14d which drives a steering link (not shown) connected to the steerable road wheels.

The control unit 5 receives electrical signals T, ω, and V and supplies the solenoids 13d and 13e with controlled electrical currents in response thereto. The control unit 5 derives the augmenting ratio of the manual steering force on the basis of the levels of the signals ω and V. The steering torque sensor 3 which is mounted on a steering shaft 15a outputs a steering torque signal T. The steering angular deviation sensor 2 which is also mounted on the steering shaft 15a outputs the steering angular deviation signal ω. The vehicle speed sensor 4 outputs the vehicle speed signal V.

The control unit 5 sends the solenoids 13d and 13e of the control valve 13 a signal ordering the spool 13b to switch between the output ports 13k and 13l, e.g. from the first output port 13k to the second output port 13l, when it receives a non-zero-level steering angular deviation signal ω and a zero-level steering torque signal T.

Figure 3:
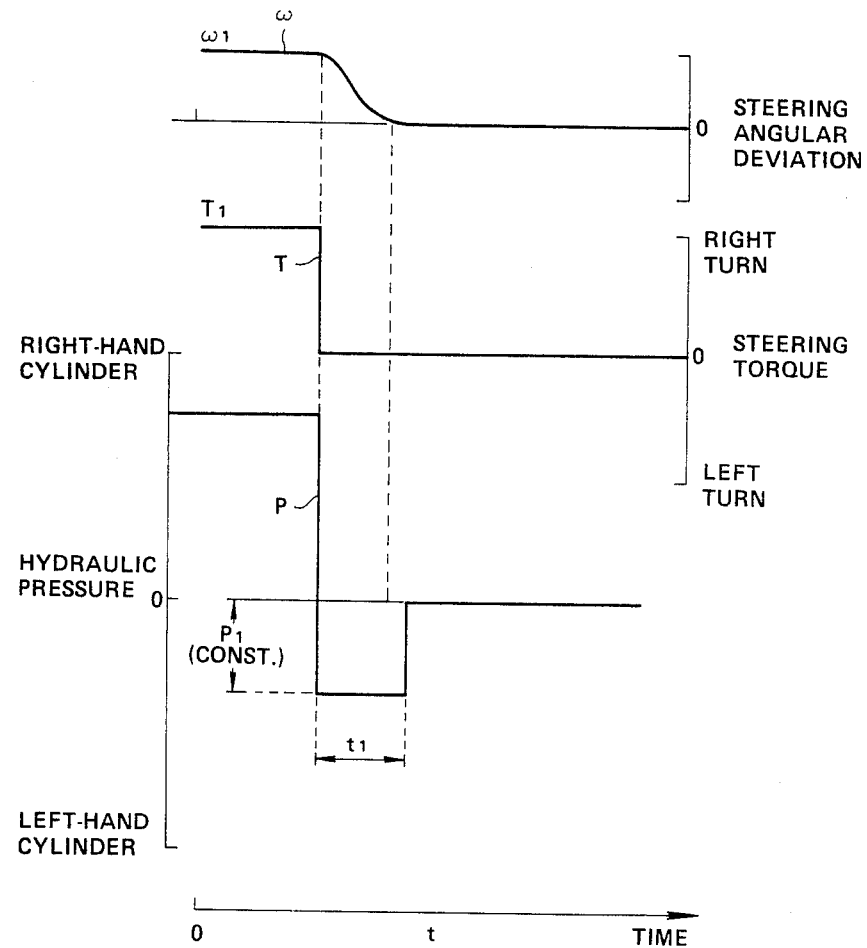
FIG. 3 is a graph illustrative of the transient properties of the hydraulic pressure in the system of FIG. 1 as the steering wheel returns to its normal position.

FIG. 3 is a graph illustrative of a first example of the return control procedure. When the driver returns the steering wheel 15 from its cornering position to its normal position, i.e. as the level of the steering angular deviation signal ω starts to drop from a value $\omega_1$ corresponding to he cornering position of the steering wheel 15 towards zero, the level of the steering torque signal T drops quickly from a value $T_1$ to zero. When the level of the steering torque signal T reaches zero, the control unit 5 orders the spool 13b to switch between the output ports 13k and 13l of the control valve 13 as previously recited. For example, after the automotive vehicle turns right, the control valve 13 is switched so that a return-assist pressure $P_1$ is developed in the left-hand chamber 14c in excess of the pressure in the right-hand chamber 14b.

The return-assist pressure $P_1$ helps the steerable road wheels to align themselves straight-ahead and the steering wheel 15 to return to its normal position. The return-assist pressure $P_1$ is a predetermined constant value. The working period of time $t_1$ for which the return-assist pressure $P_1$ prevails is controlled in response to the levels of the steering angular deviation signal ω and the vehicle speed signal V.

Figure 4:
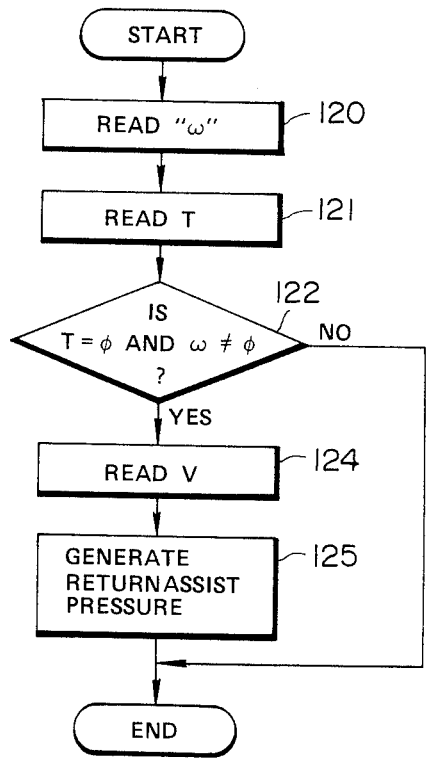
FIG. 4 is a flowchart illustrative of the operation of the system of FIG. 1.

FIG. 4 is a flowchart illustrative of this return control procedure performed by the control unit 5. The control unit 5 reads in the steering angular deviation signal ω at a frame 120 and the steering torque signal T at a frame 121. Then, the control unit 5 determines at a frame 122 if both the level of the steering angular deviation signal ω is non-zero and the level of the steering torque signal T is zero. If the answer at the frame 122 is YES, then the control unit reads in the vehicle speed signal V at a frame 124. Finally, the control unit 5 orders at a frame 125 the power-assist actuator 1 to perform the return control procedure as previously described. On the other hand, if the answer at the frame 122 is NO, i.e. if either the value T is non-zero or the value ω is zero, the flowchart bypasses the frame 124 and 125 so that the return control procedure will not be performed.

Figure 5:
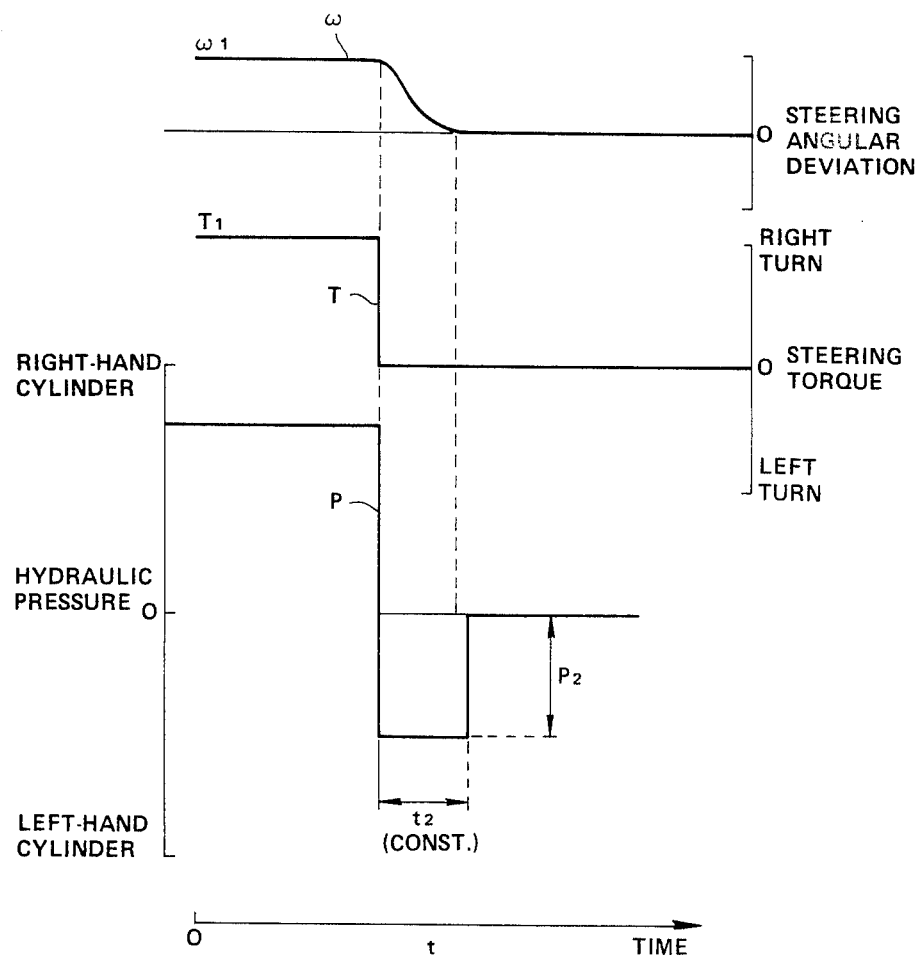
FIG. 5 is a graph similar to FIG. 3 for another embodiment of this invention.

FIG. 5 is a graph illustrative of a second example of the return control procedure. In this example, a return-assist pressure $P_2$ is determined as a level for a fixed period of time $t_2$ so as to return the steerable road wheels to straight-ahead alignment and to restore the steering wheel 15 at its normal position.

Alternatively, both of the return-assist pressure and time may be variably controlled.

This invention is applicable to a power-steering system employing an electrical motor as a power-assist actuator.

What is claimed is:

1. An automotive power-steering system comprising:
   a steering mechanism means associated with a steering wheel for performing vehicular steering operation;
   a first sensor means for monitoring a magnitude of said steering mechanism deviation from a neutral position of said steering mechanism means, said first sensor means producing a first sensor signal representative of a deviation magnitude of said steering mechanism means;
   a second sensor means for monitoring a manual steering force applied through said steering wheel and for producing a second sensor signal representative of the steering force applied;
   a power-assist actuator means, associated with said steering mechanism means, for augmenting a manual steering force and for transmitting the augmented steering force to said steering mechanism means, said power-assist actuator operating said steering mechanism means at a shifted position corresponding to an angular position of said steering wheel; and
   a control means for deriving a first control signal for controlling operation of said actuator means toward a first steering direction toward which said steering wheel is operated, and for deriving a second control signal for directing said actuator to operate said steering mechanism means toward said neutral position when said second sensor signal is indicative of no steering force applied and said first sensor signal is indicative of deviation of said steering mechanism from said neutral position during a set period of time starting from a point in time at which the steering force falls to zero when the deviation of said steering mechanism is of at least a given value.

2. The automotive power-steering system as recited in claim 1, which further comprises a third sensor means for monitoring a vehicle speed and producing a third sensor signal representative of a vehicle speed, and wherin said control means derives an augmenting ratio of a manual steering force as a function of said first sensor signal and said third sensor signal.

3. A system as recited in claim 1, wherein said power-assist actuator comprises a hydraulic power-cylinder.

4. A system as recited in claim 3, wherein the power cylinder is controlled by a hydraulic control valve which is driven by said controlling means.

5. A system as recited in claim 4, wherein the hydraulic control valve is a spool valve.

6. A system as recited in claim 5, wherein said spool valve comprises a spool driven by a solenoid adjustably energized by said controlling means.

7. A system as recited in claim 1, wherein said second sensor comprises a torque sensor.

8. A method for power-steering an automotive vehicle, comprising the steps of:
   monitoring steering angular deviation of a steering mechanism from its neutral position;
   monitoring manual steering force through a steering wheel of the steering mechanism;

augmenting a manual steering force applied to a steering mechanism by means of a power-assist actuator in accordance with the steering angular deviation; and generating a force acting against resistance to the return of the steering mechanism from an operated position to a neutral position in response to a zero-level steering force and a non-zero-level steering angular deviation of the steering mechanism during a set period of time, starting from a point in time at which the manual steering force falls to zero when the angular deviation of said steering mechanism is of at least a given value.

9. A method as recited in claim 8, wherein the force is of a fixed magnitude and an adjustable duration.

10. A method as recited in claim 8, wherein the force is of an adjustable magnitude and a fixed duration.

11. A method as recited in claim 8, wherein the duration of the force is greater than the period of time required for the steering angular deviation to drop to zero.

* * * * *